United States Patent [19]

Pacer

[11] Patent Number: 5,234,247

[45] Date of Patent: Aug. 10, 1993

[54] QUICK RELEASE DEFLECTOR SHIELD

[75] Inventor: Gregory J. Pacer, Des Moines, Iowa

[73] Assignee: DFM Corporation, Urbandale, Iowa

[21] Appl. No.: 756,818

[22] Filed: Sep. 9, 1991

[51] Int. Cl.⁵ .............................................. B60J 1/20
[52] U.S. Cl. ................................. 296/91; 403/408.1
[58] Field of Search ............................ 296/91, 180.2;
180/68.6; 403/408.1

[56] References Cited

U.S. PATENT DOCUMENTS

| | | | |
|---|---|---|---|
| 3,022,848 | 2/1962 | Heiser | 180/69 |
| 4,052,099 | 10/1977 | Lowery et al. | 296/91 |
| 4,621,860 | 11/1986 | Gerst | 296/91 |
| 4,627,657 | 12/1986 | Daniels et al. | 296/91 |
| 4,952,006 | 8/1990 | Willey | 296/91 |
| 5,082,321 | 1/1992 | Brewer | 296/91 |

FOREIGN PATENT DOCUMENTS 3803136 2/1989 Fed. Rep. of Germany .

Primary Examiner—Robert R. Song

Attorney, Agent, or Firm—Zarley, McKee, Thomte, Voorhees & Sease

[57] ABSTRACT

An air current deflector shield is provided having a substantially horizontally disposed base portion and an integrally formed deflecting portion extending upwardly from the base portion so as to deflect air over the windshield of a motor vehicle. The shield is mounted to the hood of the vehicle with a plurality of quick release fasteners, including a grommet having a plurality of expandable legs, and a plunger slidably positioned within the grommet for movement between a locked position and an unlocked position. When the plunger is moved to the locked position, the legs of the grommet are expanded into frictional engagement with holes in the hood of the vehicle, so as to securely mount the shield upon the hood. When the plunger is moved to the unlocked position, the legs of the grommet are collapsible for withdrawal from the holes in the hood, such that the shield can be quickly and easily removed from the hood.

14 Claims, 1 Drawing Sheet

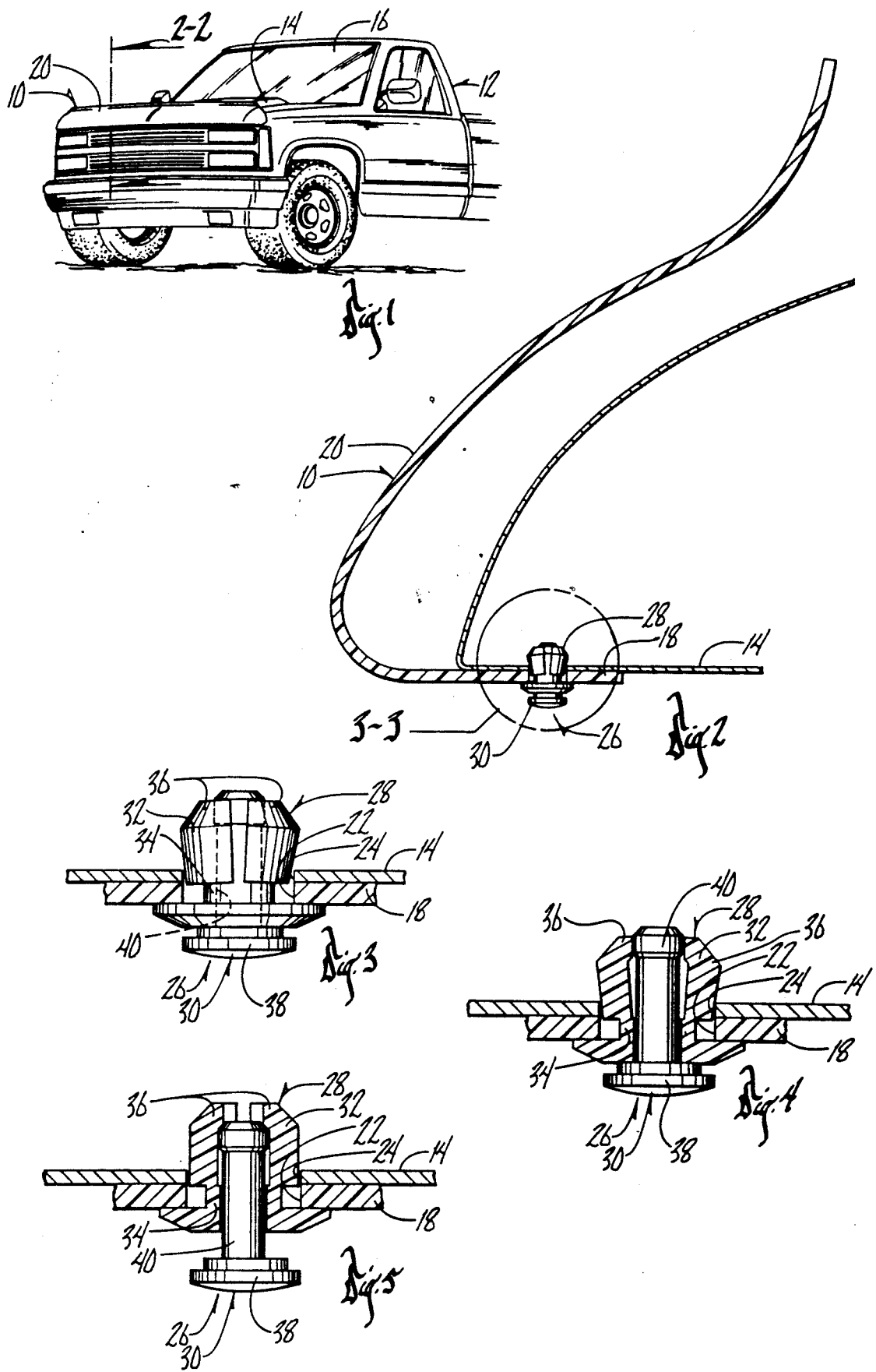

QUICK RELEASE DEFLECTOR SHIELD

BACKGROUND OF THE INVENTION

Air current deflector shields have been used for many years on motor vehicles, such as cars and trucks, so as to deflect air upwardly over the windshield of the vehicle. Such a deflection of air helps to keep the windshield clean, by carrying insects, rain and snow over the windshield. The deflector shields also deflect rocks and the like over the windshield so as to prevent cracks and chips in the wind-shield. These deflector shields are normally mounted to the hood of the vehicle using screws or bolts. Such fastening means is, for all practical purposes, permanent, in that once the shields are mounted on the hood, it is not normally removed. Such permanent mounting of the shield on the hood of the vehicle of the vehicle makes it difficult to wash and wax the hood adjacent the shield. Also, with a permanently attached shield, it is not safe to go through automated car washes which use rotating brushes without breaking or cracking the shield.

Accordingly, the primary objective of the present invention is the provision of an improved air current deflector shield which can be quickly and easily mounted and dismounted from the hood of a vehicle.

Another objective of the present invention is the provision of an air current deflector shield that has a quick release fastening system for mounting the shield on the hood of a vehicle.

Still another objective of the present invention is the provision of an air current deflector shield which is securely, yet releasably, mounted on the hood of a vehicle.

Yet another objective of the present invention is the provision of an air current deflector shield which can be repeatedly mounted and dismounted from a vehicle hood.

A further objective of the present invention is the provision of an air current deflector shield and mounting apparatus for the shield which is economical to manufacture and durable in use.

SUMMARY OF THE INVENTION

The air current deflector shield of the present invention has a unitary construction and is mounted to the hood of a vehicle with a plurality of quick release fasteners. More particularly, the deflector shield includes a base portion extending substantially horizontally for mounting to the hood of a vehicle. The base portion has a plurality of holes therein which are aligned with holes in the hood for receiving the quick release fasteners. The fasteners include a grommet having a plurality of legs which are expanded by a plunger slidably received within the grommet. When the plunger is moved to the locked position, the legs of the grommet are moved to an expanded position so as to securely lock the shield member in position on the hood. When the plunger is moved to an unlocked position, the legs of the grommet are collapsible so that the shield can be removed from the hood. The shield also includes a deflecting portion integrally formed with and extending upwardly from the base portion so as to deflect air upwardly over the windshield.

BRIEF DESCRIPTION OF THE DRAWINGS

FIG. 1 is a perspective view of the shield of the present invention mounted on the hood of a pickup truck.

FIG. 2 is a sectional view of the shield taken along lines 2—2 of FIG. 1.

FIG. 3 is an enlarged view taken along lines 3—3 of FIG. 2 and showing the quick release fastener used in mounting the shield.

FIG. 4 is a sectional view of the fastener in a locked position.

FIG. 5 is a sectional view of the fastener in an unlocked position.

DETAILED DESCRIPTION OF THE DRAWINGS

Referring to the drawings, reference numeral 10 generally designates an air current deflector shield of the present invention. Shield 10 is adapted for use on a motor vehicle 12, such as a car or truck, and is mounted on hood 14 of vehicle 12 so as to deflect air upwardly over windshield 16 of the vehicle.

Shield 10 includes a base portion 18 and an integrally formed deflecting portion 20 extending upwardly from the base portion. Deflecting portion 20 may take various designs and cross sectional shapes without departing from the scope of the present invention. Base portion 18 includes a plurality of apertures 22 which are adapted to be aligned with apertures 24 in hood 14.

Shield 10 is releasably mounted to hood 14 by a plurality of quick release fasteners 26. Fasteners 26 include a grommet 28 and a plunger 30. Grommet 28 has a head 32, a neck 34 and a plurality of expandable legs 36. As best seen in FIGS. 3-5, head 32 of grommet 28 engages one side of shield 10 and legs 36 are positioned on the opposite side of shield 10, with neck 34 extending through one of holes 22 in the base portion 18 of shield 10. Holes 22 are sufficiently large to allow legs 36 to be forced therethrough when they are in a collapsed state, as shown in FIG. 5, such that grommet 28 is retentively engaged within hole 22 of base portion 18.

Each hole 24 in hood 14 has a diameter sufficient to allow legs 36 of grommet 28 to reside therein. Plunger 30 has a head 38 and a body 40. Body 40 of plunger 30 slidably extends into grommet 28 so as to be movable between a first extended or locked position and a second retracted or unlocked position. In the locked position, plunger 30 is pushed into grommet 28 so as to expand legs 36 into frictional engagement with hole 24 in hood 14, and thereby securely mount shield 10 onto the hood. When plunger 30 is moved to the blocked position, such that body 40 is retracted from legs 36 of the grommet, the legs are collapsible so that grommet 28 can be withdrawn from hole 24 in hood 14. Accordingly, shield 10 can be quickly and easily removed from hood 14.

In use, the grommet 28 of each quick release fastener 26 is pushed through the hole 22 in base portion 18 of shield 10. The fasteners 26 are then aligned with holes 24 in the hood 14 such that the legs 36 of the fasteners extend into holes 24. Each plunger 30 is then manually moved to the locked position by pushing on head 38 such that body 40 expands legs 36 of grommet 28, thereby frictionally engaging the walls of holes 24 in hood 14, such that the shield is securely held in place on the hood. When it is desirable to remove the shield from the hood, the heads 38 of each plunger 30 are pulled so as to retract body 40 from legs 36 of grommets 28, thereby allowing legs 36 to collapse radially for withdrawal from holes 24 of hood 14 and holes 22 of shield 10. Thus, the shield can be quickly and easily mounted and removed from hood 14.

It is understood that the quick release fastening system of the present invention can be used on deflector shields which include a mounting bracket or channel holding a shield member therein, as opposed to a shield having unitary construction. Fasteners 26 are available from the Hartwell Corporation, Placentia, Calif.

From the foregoing, it can be seen that the present invention accomplishes at least all of the stated objectives.

What is claimed is:

1. An air current deflector shield for use on a vehicle having a hood and a windshield, comprising:
   a shield member having a substantially horizontal base portion adapted to be mounted to the hood and an integrally formed deflecting portion extending upwardly from the base portion so as to deflect air upwardly over the windshield as the vehicle moves forwardly;
   mounting means for releasably mounting the shield member to the hood, including a grommet adapted to extend through aligned holes in the shield member and the hood, and a plunger adapted to extend through and expand the grommet for securing the shield member to the hood.

2. The deflector shield of claim 1 wherein the grommet has expandable legs and wherein the plunger is movable between a first extended position wherein the legs of the grommet are expanded so as to secure the shield member to the hood and a first retracted position wherein the legs of the grommet are collapsible wherein the shield is removable from the hood.

3. The deflector shield of claim 2 wherein the grommet includes a head portion engaging one side of the shield opposite the hood and a neck portion interconnecting the head portion and legs and residing in the hole in the shield.

4. A method of releasably mounting an air current deflector shield to the hood of a vehicle, comprising:
   aligning holes in the shield with holes in the hood;
   manually pushing a fastening means into each of the aligned holes in the shield and hood, the fastening means including a grommet with a plunger slidably extending therethrough; and
   depressing the plunger into the grommet so as to force the grommet into retentive engagement with the hood, thereby securing the shield to the hood.

5. The method of claim 4 further comprising withdrawing the plunger from the grommet so as to release the grommet from retentive engagement with the hood, thereby releasing the shield from securement to the hood.

6. The method of claim 4 wherein a plurality of quick release fastening means are used in a plurality of aligned holes in the shield and hood to releasably secure the shield to the hood.

7. In improved air current deflector shield, comprising:
   a shield member for deflecting air upwardly over the windshield of a vehicle; and
   mounting means for releasably mounting the shield member on the hood, including a plurality of quick release fasteners extending through the shield member and hood, the fasteners being movable between a locked position wherein each fastener has an increased diameter to secure the shield member to the hood and an unlocked position wherein each fastener has a reduced diameter such that the shield is removable from the hood.

8. The deflector shield of claim 7 wherein the shield member includes a horizontally disposed base portion for attachment to the hood.

9. The deflector shield of claim 8 wherein the base portion of the shield member has a plurality of holes adapted to be aligned with corresponding holes in the hood.

10. The deflector shield of claim 9 wherein the fasteners include a grommet secured through a hole in the shield member and a plunger slidably extending through the grommet.

11. The deflector shield of claim 10 wherein the shield has opposite sides, and the grommet has a head positioned on one side of the shield member opposite the hood, a plurality of expandable legs on the other side of the shield, and a neck interconnecting the head and legs, the legs being expanded when the plunger is in the locked position to secure the shield member to the hood and the legs being retractable when the plunger is in the unlocked position to allow the fastener, and thus the shield member, to be removed from the hood.

12. A method of removably mounting a shield to a hood of a vehicle, the shield having a base portion with a plurality of holes therein adapted to align with corresponding holes in the hood, the method comprising:
   inserting a fastener into aligned holes in the shield base portion and the hood, the fastener having a first diameter sufficiently small to pass through the aligned holes; and
   expanding a portion of the fastener to a second diameter greater than the first diameter so as to secure the shield to the hood.

13. The method of claim 12 further comprising contracting the portion of the fastener to the first diameter so that the shield is removable from the hood.

14. The method of claim 13 wherein the fastener includes a grommet adapted to extend through the aligned holes in the shield and the hood, and a plunger slidably mounted in the grommet, wherein extending the plunger into the grommet expands the portion of the fastener and retracting the plunger relative to the grommet contracts the portion of the fastener.

* * * * *